(12) United States Patent
Knowles et al.

(10) Patent No.: US 6,365,871 B1
(45) Date of Patent: Apr. 2, 2002

(54) LASER-DRILLING

(75) Inventors: Martyn Richard Huw Knowles; Andrew John Kearsley; Anthony John Andrews; Andrew Ian Bell; Graham Rutterford; Gideon John Foster-Turner, all of Oxford (GB)

(73) Assignee: Oxford Lasers Limited, Abingdon (GB)

(*) Notice: Subject to any disclaimer, the term of this patent is extended or adjusted under 35 U.S.C. 154(b) by 0 days.

(21) Appl. No.: 09/486,964

(22) PCT Filed: Aug. 28, 1998

(86) PCT No.: PCT/GB98/02591

§ 371 Date: Mar. 3, 2000

§ 102(e) Date: Mar. 3, 2000

(87) PCT Pub. No.: WO99/11419

PCT Pub. Date: Mar. 11, 1999

(30) Foreign Application Priority Data

Sep. 3, 1997  (GB) ............................................. 9718549

(51) Int. Cl.$^7$ .......................... B23K 26/00; B23K 26/14
(52) U.S. Cl. .............................. 219/121.7; 219/121.67; 219/121.71
(58) Field of Search ................... 219/121.7, 121.71, 219/121.67

(56) References Cited

U.S. PATENT DOCUMENTS

| | | | | |
|---|---|---|---|---|
| 4,639,572 A | * | 1/1987 | Gruzman et al. | 219/121 LG |
| 4,808,785 A | * | 2/1989 | Vertz et al. | 219/69 M |
| 4,873,414 A | * | 10/1989 | Ma et al. | 219/121.7 |
| 5,096,379 A | * | 3/1992 | Stroud et al. | 416/97 R |
| 5,365,033 A | * | 11/1994 | Williams | 219/121.71 |
| 5,767,480 A | * | 6/1998 | Anglin et al. | 219/121.69 |
| 5,994,667 A | * | 11/1999 | Merdan et al. | 219/121.67 |
| 6,054,673 A | * | 4/2000 | Chen | 219/121.71 |

FOREIGN PATENT DOCUMENTS

| | | | | |
|---|---|---|---|---|
| EP | 0376682 A1 | * | 7/1990 | 219/121.7 |
| EP | 0713745 A1 | * | 5/1996 | 219/121.7 |
| EP | 0753373 A | | 1/1997 | |
| EP | 0768140 A | | 4/1997 | |

OTHER PUBLICATIONS

United Kingdom Patent Office Search Report dated Apr. 9, 1998.

* cited by examiner

*Primary Examiner*—Tom Dunn
*Assistant Examiner*—L. Edmondson
(74) *Attorney, Agent, or Firm*—Fleshner & Kim, LLP

(57) ABSTRACT

A method of laser-drilling a hole through a workpiece, such as an injector nozzle (40), into a cavity comprising drilling a hole (41) through the workpiece (40) with a laser (50), providing a fluid having laser-barrier properties in the cavity so that, when the hole (41) is open to the cavity, laserlight passing through the hole (41) is incident upon the fluid whereby the workpiece (40) across the cavity from the hole (41) is protected from the laserlight, and arranging that the fluid does not enter the laser-drillled hole (41) during the drilling process. Apparatus for performing the method is also described.

56 Claims, 6 Drawing Sheets

LASER-DRILLING

This invention relates to a method of drilling a hole into a workpiece with a laser, and to apparatus for carrying out the method.

The technology of laser-drilling holes is established, but one particular problem arises when a hole is to be drilled through a workpiece into a cavity in the workpiece. This problem arises because the drilling of the hole then enables the laser beam passing through the hole to strike the workpiece on the opposite side of the cavity, causing damage to the workpiece and conceivably drilling a further hole through it. An attempt to deal with this problem has been to insert a metal pin in the cavity to obstruct the laser beam, but the pin is then damaged by the laser beam and has to be replaced, debris from the pin has to be cleared, and the design of the cavity can make the insertion of a pin difficult.

A particular workpiece to which this invention may be applied is a fuel injection nozzle, especially for diesel fuel, but there are many other industrial applications, of which some are exemplified later in this specification.

It is an object of the present invention to provide an improved method of laser-drilling a hole through a workpiece into a cavity in the workpiece, and to provide apparatus for carrying out the method.

In accordance with the present invention, a method of laser-drilling a hole through a workpiece into a cavity in the workpiece comprises drilling a hole through a workpiece with a laser, providing a fluid having laser-barrier properties in the cavity so that, when the hole is open to the cavity, laser light passing through the hole is incident upon the fluid whereby the workpiece across the cavity from the hole is protected from the laserlight, and arranging that the fluid does not enter the laser-drilled hole during the drilling process.

Preferably a method of laser-drilling a hole through a workpiece into a cavity in the workpiece comprises substantially filling the cavity in alignment with the hole to be drilled with a fluid having laser-barrier properties, drilling the hole with a laser, and arranging that the fluid does not enter the hole when the hole is open to the cavity.

The fluid may have laser-light scattering properties, in which case the fluid may be a liquid in which case the liquid may be a colloid, or the fluid may be gas-borne particles such as a smoke as an example, or liquid droplets. Generally the term "fluid" covers anything that can flow, including a fluidised particulate bed, eg. of carbon particles, or ceramic particles or metal particles.

The fluid may have laser-light absorbing properties in which case the fluid preferably absorbs laser-light as thermal energy and may be a particulate suspension such as a liquid suspension of pigment particles as an example.

If the fluid has laser-light absorbing properties, it may fluoresce to re-emit the energy of incident laser light at a different frequency, and is preferably a liquid solution of a dye-stuff.

Preferably the pressure of the fluid in the cavity is arranged to be sufficiently low that the fluid does not enter the hole when the hole is open to the cavity.

Preferably also the fluid is a liquid and its surface tension and/or contact angle adjacent to the hole is taken into account in arranging the pressure of the liquid to be sufficiently low that the liquid does not enter the hole when the hole is open to the cavity.

Preferably the pressure of the fluid in the cavity is less than the ambient pressure external of the workpiece.

The method may include directing a gas stream at the workpiece at the same place as the laser beam and arranging that the pressure of the fluid in the cavity is less than the combination of the ambient pressure external of the workpiece and the pressure applied to the workpiece by the gas stream.

Preferably at least some of the fluid in the cavity is passed across alignment with the hole to be drilled.

Preferably also the fluid is recirculated in the cavity.

Preferably further the cavity is provided with a fluid flow pipe, and fluid is supplied to or extracted from the cavity through the fluid flow pipe to aid recirculation of the fluid in the cavity.

Preferably further fluid is pumped into the cavity and fluid is pumped out of the cavity.

Preferably further the fluid is supplied to the cavity through the fluid flow pipe, and the fluid flow pipe is located in such a position that it is out of alignment with the hole to be drilled in the workpiece, but the stream of fluid issuing from the fluid flow pipe comes into such alignment before its flow loses its integrity.

Preferably further the interior shape of the hole is drilled by orbiting the laser beam repeatedly around the desired path.

The method may further comprise providing a separator between the fluid and the hole to control the interaction of the fluid and scattered laser light with the hole. For example, when the fluid is in contact with the hole and if the fluid is heated by absorption of the laser beam, then the heat of the fluid can be transferred to the hole or the area around the hole. This can cause melting of the workpiece surface in the hole and its vicinity. When the fluid with laser-barrier properties has laser light scattering properties, then the scattered light can have sufficient intensity to melt or vaporise the workpiece. Therefore, if the fluid were to enter the hole, the scattering can enlarge the diameter and/or change the shape of the hole. It can also cause the edge of the hole in the cavity to become shaped or rounded. There are many other ways in which the interaction of the laser and fluid can affect the hole and the workpiece and these effects can be advantageous or disadvantageous. Therefore, this invention gives a method and apparatus for controlling these effects whilst protecting the cavity wall from damage by the laser beam.

Alternatively the method further comprises at least partially inserting a separator between the fluid and the hole so that when the hole is open to the cavity, the interaction of the fluid and the laser light with the hole is controlled.

The fluid may have cooling properties in addition to laser-light absorbing and/or laser-light scattering properties.

A volume of gas may be used as the separator to control the interaction between the fluid and scattered laser-light with the hole.

Preferably a stream of gas is used as the separator to control the interaction between the fluid and scattered laser-light with the hole.

A solid barrier may be used as the separator to control the interaction between the fluid and scattered laser-light with the hole.

Preferably the solid barrier is perforated with a hole or holes or a slot or slots.

Preferably also a hole or slot is in alignment with the laser beam.

Preferably also the solid barrier also prevents the fluid from splashing back or ingressing onto or into the laser drilled hole.

Light scattering properties can also be achieved by using a fluid which has micro-cavitation. The micro-cavitation forms micro-bubbles in the fluid. The micro-bubbles act like micro-lenses which cause the light incident on the micro-bubble to be focused so that it diverges rapidly. The large number of micro-bubbles have an overall effect of scattering the light into a wide range of angles so that the laser light hitting the back wall of the cavity is very diffuse and of low intensity so that it does not machine or damage the back wall. Aids to achieving micro-cavitation can be flowing the fluid in a certain way, adding other fluids or detergents or other media to the main fluid, or applying ultrasound to the fluid delivery system.

The barrier-fluid or cooling fluid may be a single fluid or a combination of fluids. The fluid or fluids may have a combination of laser-light absorbing, laser-light scattering properties and thermal cooling properties.

The complete or partial separator between the fluid and the hole may be another fluid (gas or liquid) or a solid media such as glass or crystal or ceramic or metal or plastic. It may also be some combination of materials/media.

The invention may include directing the barrier-cooling fluid so that its interaction with the hole can be controlled. For example, the fluid may be directed at the hole to increase the interaction or directed away from the hole to reduce or eliminate the interaction. Increasing the interaction may be used to enlarge the hole or shape the hole or change the surface of the hole or the cavity around the hole or some combination of these effects. Eliminating the interaction can be used to ensure sharp edges to the hole (small edge radius) where the hole breaks into the cavity.

The invention may include the use of precision machined components which fit inside the cavity and are used to deliver the barrier fluid in the required manner. These inserts may also form part of the separator or be used to deliver the fluid which forms the separator or some combination of the two. These inserts may be in the form of tubes or channels or guides or baffles and may be made from metal or ceramic or glass or crystal or plastic or any other suitable material. The insert can be constructed so as to allow the laser beam to impinge upon the fluid but have baffles and guides to prevent the fluid from splashing or ingressing onto or into the laser drilled hole.

The inserts may be used in combination with the barrier-fluids to protect the cavity wall from damage. That is, whereas a metal pin has been shown to be unsatisfactory, a metal pin with a barrier-fluid passing over its surface or inside it can be satisfactory since the barrier-fluid protects and cools the metal pin. When the insert is used in this mode, then preferably the insert is a material which is not easily damaged by the laser. The insert may be made from metal, ceramic, glass, crystal, plastic, rubber or diamond or another material.

If a pin or insert is made from a material that is easily damaged by the laser, then it should be easy and cheap to replace. For example, a graphite rod in an oxygen rich atmosphere which vapourizes when struck by the laser beam and reacts to form carbon dioxide or monoxide gas. The graphite rod could be continuously fed into the cavity and the gas extracted thereby giving protection to the cavity from the laser beam.

In accordance with the invention apparatus for laser-drilling a hole through a workpiece into a cavity in the workpiece comprises fluid supply means for providing a fluid having laser-barrier properties in the cavity so that, when the hole is open to the cavity, laser light passing through the hole is incident upon the fluid whereby the workpiece across the cavity from the hole is protected from the laser light, the arrangement being such that the fluid does not enter the laser-drilled hole during the drilling process.

Preferably apparatus for laser-drilling a hole through a workpiece into a cavity in the workpiece comprises a holder for the workpiece, fluid supply means for substantially filling the cavity in alignment with the hole to be drilled with a fluid having laser-barrier properties, and control means for arranging that the fluid does not enter the hole when the hole is open to the cavity.

Preferably said control means comprises pressure or flow regulator means to arrange that the pressure of the fluid in the cavity is sufficiently low that the fluid does not enter the hole when the hole is open to the cavity.

Preferably also said fluid supply means comprises flow means to pass at least some of the fluid in the cavity across alignment with the hole to be drilled.

Preferably further the flow means is able to recirculate fluid in the cavity.

Preferably further the flow means comprises a fluid flow pipe to be inserted in the cavity for fluid to be supplied to or extracted from the cavity through the fluid flow pipe to aid recirculation of the fluid in the cavity.

Preferably further the apparatus includes a first pump for pumping fluid into the cavity, a second pump for pumping fluid out of the cavity, and a fluid reservoir.

The second pump may be a vacuum pump, exhausting the reservoir to atmosphere, or the second pump may be a pressure pump for pumping fluid out of the cavity to the reservoir.

Preferably further the fluid flow pipe is located in such a position that it will be out of alignment with the hole to be drilled in the workpiece, but the stream of fluid that will issue from the fluid flow pipe in use will cross such alignment before its flow loses its integrity.

Preferably further the apparatus also includes a supply of a fluid having laser-barrier properties and a laser.

Preferably also the laser is a gas laser such as a copper laser.

Alternatively the laser is a solid state laser such as, but not limited to, a Nd:YAG laser, or a Nd:YLF laser, or a Nd:YVO4 laser, or a frequency doubled Nd:YAG or Nd:YLF or Nd:YVO4 laser. The solid state laser may be lamp or laser diode driven. The solid state laser may operate at any harmonic of its fundamental wavelength, for example frequency doubled, tripled, quadrupled or fifth harmonic.

The apparatus may further comprise a separator between the fluid and the hole to control the interaction of the fluid and scattered laser-light with the hole.

The separator may be a solid barrier.

The solid barrier may be perforated with a hole or holes or a slot or slots.

Preferably a hole or a slot is in alignment with the laser beam.

Preferably the solid barrier also prevents the fluid from splashing back or ingressing onto or into the laser drilled hole.

A volume of gas may be used to control the interaction between the hole and the fluid.

Preferably a stream of gas is used as the separator to control the interaction between the hole and the fluid.

The apparatus may further comprise manual or automatic means of loading the workpiece onto the apparatus and unloading the workpiece when the drilling is complete.

The apparatus may also comprise manual or automatic means to position the workpiece with respect to the laser beam so as to drill a hole or holes in the correct position(s).

Preferably a means is provided to position the workpiece on the apparatus to perform the laser drilling. This means may be in the form of a robot, or some form of automatic part-handling system, or a carousel system or a manual loading system.

When the insert makes a fluid seal with the inner surface of the nozzles and when the nozzle must rotate with respect to the insert when changing to the next hole position, then preferably there is a means to lubricate this rotation or there is a manual or automatic means to release this seal, rotate the nozzle with respect to the insert and then remake the seal.

Preferably a means is provided to position the workpiece and apparatus with respect to the laser beam. This may be in the form of a computer or programmable numerical control system with motorised positioning mechanical components.

This system may be used to position the workpiece or position the laser beam or both. It may be a system that manipulates and positions the laser beam by using mirrors or prisms or lenses or gratings or acoustic-optic deflectors or electo-optic devices or fibre optic cables or other optical components.

Preferably a computer or programmable logic controller or some other device is used to control the positioning, loading and laser systems.

Other preferred features of the invention will be apparent from the following description and from the subsidiary claims of the specification.

The invention will now be further described, merely by way of example, in two preferred examples of a method and apparatus for drilling diesel fuel injector nozzles, and by reference to the accompanying drawings, in which:

Figure 1:
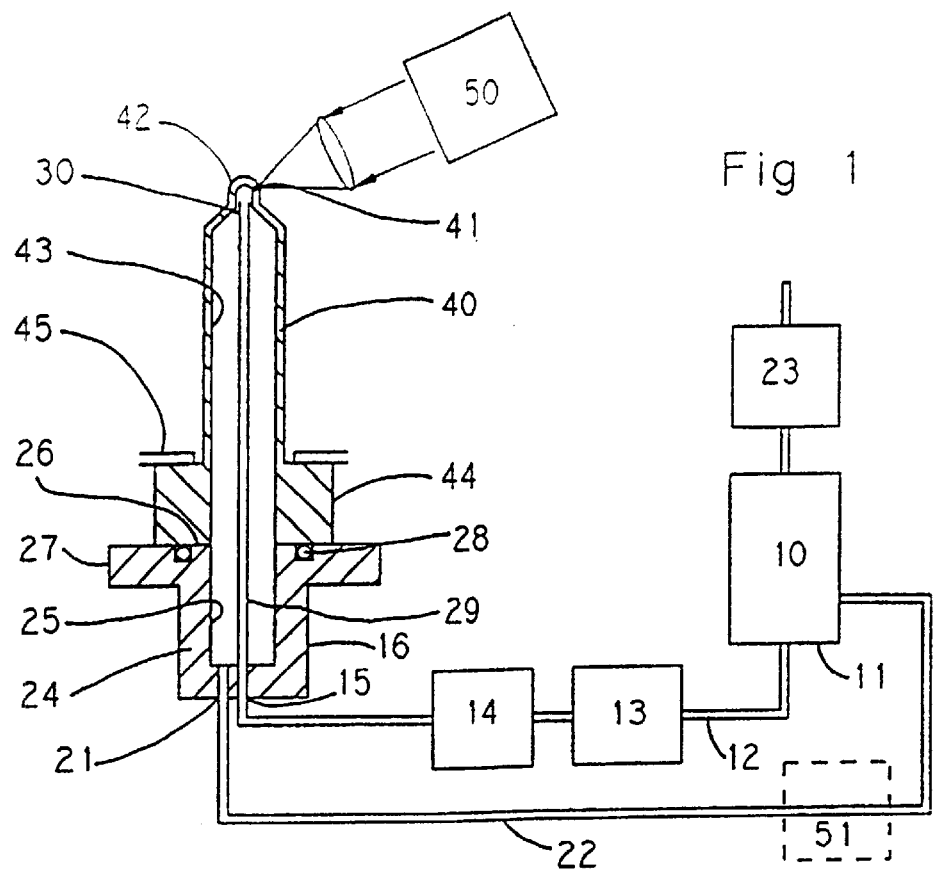
FIG. 1 is a diagramatic view of a SAC diesel fuel injection nozzle in position on a holder for laser drilling, together with the remainder of the drilling apparatus (shown schematically) for a first preferred example of the invention.

Referring initially to FIG. 1 of the drawings, the apparatus of the preferred example comprises a reservoir 10 of which the base 11 is coupled at 12 through a pump 13 and pressure regulator or flow means 14 to an input 15 in the base of a holder 16 for a diesel fuel injector nozzle 40. The holder 16 also has an output 21 coupled at 22 back to the reservoir 10. The apparatus includes a second pump 23 which is a vacuum pump connected to the top of the reservoir 10.

The holder 16 is a generally cylindrical block 24 recessed at 25 from its flat upper surface 26 which is flanged at 27 and carries a sealing ring 28. The inner end of the recess 25 is coupled to the output 21 and also carries an upstanding tube 29 extending symmetrically up through the recess 25, and beyond the surface 26 to its top 30 at a height to be described below. The input 15 is connected to the inside of the base of the tube 29.

Figure 2:
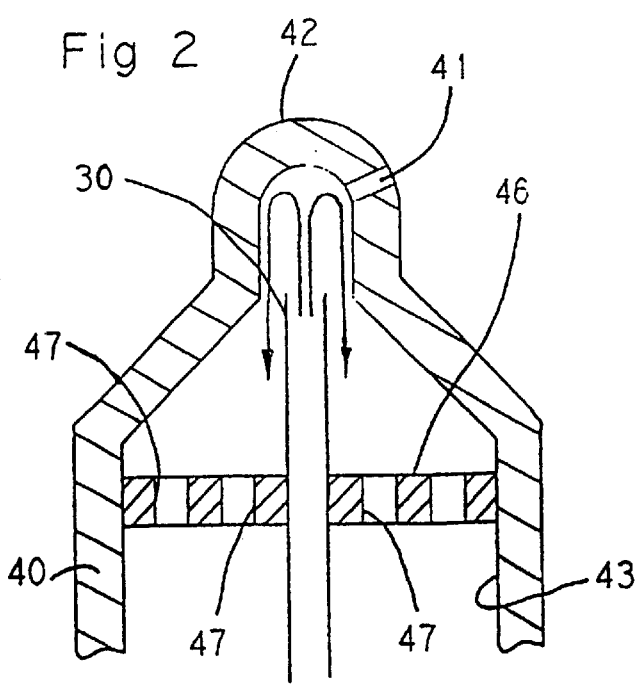
FIG. 2 is an enlarged view of the tip of the nozzle of FIG. 1 showing greater detail.

Referring now to FIG. 2 as well as FIG. 1, a diesel fuel injection nozzle 40 of the SAC type, which is to have a hole 41 laser-drilled through its otherwise closed tip 42, has a hollow cylindrical body 43 extending from the tip 42 to a deep circular flange 44. The nozzle 40 stands on the flat surface 26 of the holder 16 and is sealed to it by the sealing ring 28. A clamping plate 45, which is partly shown in FIG. 1, encircles the body 43 above, and is clamped against, the flange 44 to keep the nozzle 40 in position.

The tube 29 extends along about the whole length of the cavity in the body 43 with its top 30 just sufficiently short of the tip 42 so as not to come into alignment with the axis of the hole 41. This can be seen in FIG. 2, which also shows that the tube 29 carries a spacing washer 46 which is an easy sliding fit within the cylindrical part of the cavity in the body 43 just below the tip 42, and is perforated at 47 for fluid to pass easily through it. In order to be suitably sized for the nozzle 40, the overall length of the tube 29 can be 20–50 mm and its external diameter is 200–1000 microns, so that the spacing washer 46 accurately locates and centres the tube 29 as the nozzle 40 is being positioned on the holder 16.

The apparatus is also provided with a copper laser 50, although other gas lasers may be used, or a solid state laser such as a Nd:YAG laser, a Nd:YLF laser or a Nd:YVO4 laser or a frequency doubled Nd:YAG or Nd:YLF or Nd:YVO4 laser. The laser 50 is lined up to drill the hole 41, and may later go. on to drill a ring of such holes in the nozzle 40.

In use, the reservoir 10 is partly filled with a liquid having laser-light barrier properties, such as the proprietary machine lubricant available under the trade mark "DROMUS". This is a colloid which by multiple scattering is a barrier to laser-light. A nozzle 40 is mounted on the holder 16. The pumps 13 and 23 are then actuated to pump the liquid along the coupling 12 and up the tube 29 to substantially fill the cavity, particularly in alignment with the hole to be drilled. At the same time, the vacuum pump 23 continuously extracts the liquid from the nozzle cavity along the coupling 22 back to the reservoir 10 from which the liquid is gravity fed to the pump 13. Thus the liquid is recirculated in the cavity, and any bubbles or gaseous products in the liquid are removed from the reservoir 10 by the vacuum pump 23 to atmosphere.

The pressure regulator means 14 is used to control the flow of liquid to the cavity to ensure that the liquid does not enter the hole 41 when it is open to the cavity. The surface tension of the liquid may be taken into account in arranging that the pressure of the liquid in the cavity is sufficiently low that the liquid does not enter the hole 41 when it is open to the cavity, but otherwise the pressure of the liquid in the cavity is less than the ambient pressure external of the workpiece.

The laser is then powered, typically firing in the range 1,000–50,000, normally 10,000 pulses per second orbiting a 1–100, normally 10 micron spot repeatedly around a circular path at 1–100, preferably 40 to 80 r.p.s. to trepan the required hole, which can be from 40 to 200 microns in diameter. When the hole has first been pierced, typically after 1 second or less for 1 mm hole depth, the laser-barrier properties of the liquid in the cavity prevent the laser beam from striking the opposite side of the nozzle 40 where it would cause damage or even drill another hole. A further 5–20 seconds may be needed for the shape of the hole to be refined by the laser beam, for example to achieve low conicity, which is easily long enough that major damage would occur on the opposite side of the nozzle in the absence of the liquid. The jet of liquid issuing from the top 30 of the tube 29 is directly across alignment with the laser beam, and is therefore a barrier to it, even if the integrity of the jet is soon lost from turbulence and bubble formation from laser-generated heat in the cavity, and air being drawn into the cavity through the hole. The liquid also carries the heat away from the cavity, thus protecting the nozzle from heat damage, together with any waste products. If necessary, the coupling 22 can be fitted with a cooler 51, shown in dashed lines in FIG. 1.

Once the hole 41 has been drilled, or after an array of such holes has been drilled, the pump 13 is de-activated so that the liquid is then pumped out of the nozzle cavity. Gravity can be used to assist the liquid to drain out of the cavity.

Instead of the multiple scattering of laser light fluid by the "DROMUS" lubricant, a laser-barrier may absorb laser-light as thermal energy. Fluids which absorb energy thermally include particulate suspensions such as a liquid suspension of pigment particles. If the fluid has laser-light absorbing properties, it may fluoresce to re-emit the energy of incident laser light at a different frequency. An example of such a fluid is a liquid solution of a dye-stuff. It is not necessary for the fluid or dye-stuff to fluoresce. Mixtures of fluids with properties of light-scattering or energy absorption can be used.

Figure 3:
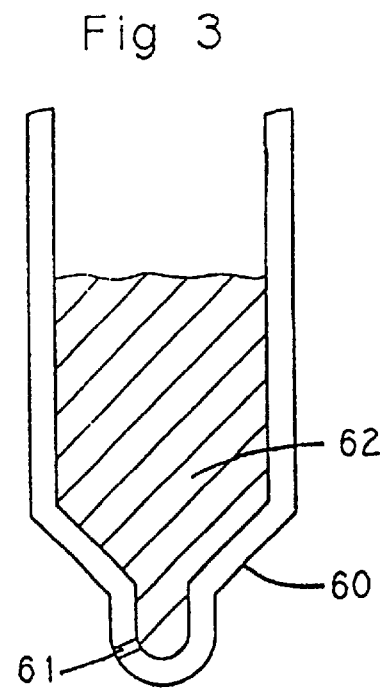
FIG. 3 is a similar view to FIG. 1 for a modification of the first preferred example.

FIG. 3 illustrates a very simple modified apparatus in which a SAC nozzle 60 is simply filled with a liquid 62 having laser-barrier properties before a hole 61 is laser drilled into it. The surface tension of the liquid 62 is sufficient to prevent the liquid from entering the hole 61 once it is open, for example by using mercury as the liquid. The laser beam may be supplemented in its drilling capability by being accompanied by a gas stream directed at the same place as the laser beam. The gas may be air or an inert gas or a high oxygen gas. The pressure applied to the nozzle by the gas stream than adds to the surface tension of the liquid to keep the latter out of the hole. A gas stream system may also be used with the preferred example of FIGS. 1 and 2 of the drawings.

The description above is particularly related to SAC-type diesel fuel injection nozzles, but is equally applicable to the VCO type of nozzle, direct gasoline fuel injection nozzles, the circulation holes in turbine blades, printer ink feed matrices, and any other situation in which a hole is to be laser-drilled into a workpiece containing a cavity.

A long pulse (1 micro-second–10 milliseconds), from 1 to 1,000 pulses per second, may be used with a Nd:YAG laser for fuel injectors as well as for turbine blades, in which case, each hole could be drilled directly, and not trepanned. Printer ink feed matrices can be drilled in a similar way to fuel injection nozzles, but on a smaller scale, perhaps with multiple pulses using either a stationary beam or trepanned.

The use of fluids with laser-barrier properties is particularly beneficial in that flow of the fluid is immediately possible to remove bubbles, heat and waste from the drilling process, and that pressure or flow adjustment of the fluid can keep it out of the laser-drilled hole when it would interfere with the drilling process.

Figure 4:
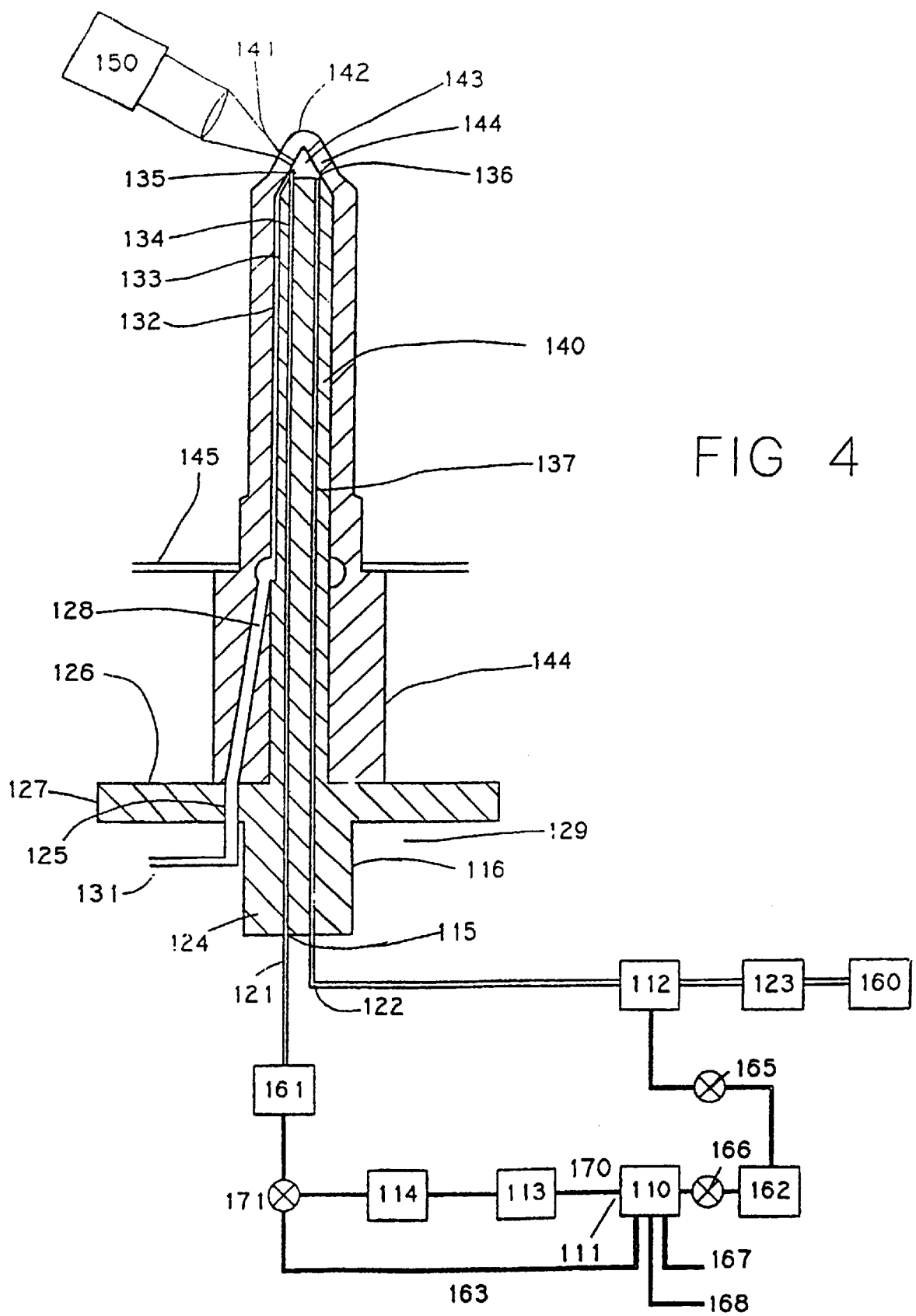
FIG. 4 is a diagrammatic view of a VCO diesel fuel injection nozzle in position on a holder for laser drilling, together with the remainder of the drilling aparatus (shown schematically) for a second preferred example of the invention.

Referring now to FIG. 4 of the drawings, the apparatus of this second preferred example comprises a reservoir 110 of which the base 111 is coupled at 170 through a pump 113 and pressure regulator or flow means 114 via a flow switch 171 through a filter 161 and coupling 121 to an input 115 in the base of a holder 116 for a VCO diesel fuel injector nozzle 140. The holder 116 also has an output coupled at 122 back to a vacuum reservoir 112.

The apparatus includes a second pump 123 connected to the top of the reservoir 112 and fitted with a filter 160 to prevent pollution from and to the atmosphere. Valves 165 and 166 to either side of a top-up pump 162 connect the vacuum reservoir 112 to the reservoir 110. The reservoir 110 also has a bypass connection 163 direct to the flow switch 171, and couplings 167 and 168.

Figure 5:
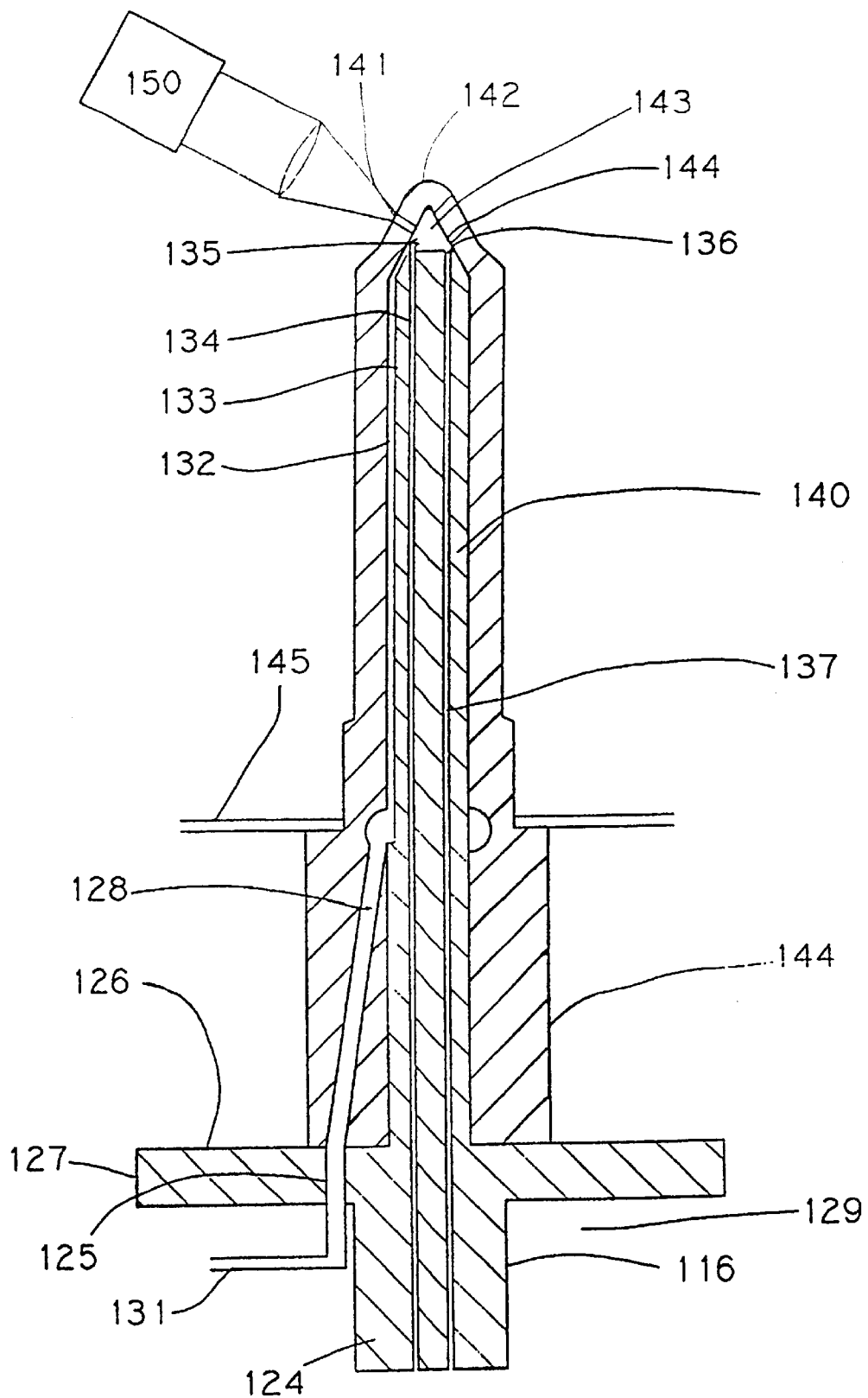
FIG. 5 shows on a larger scale the insert and the method of delivering the fluid in a VCO nozzle taken from FIG. 4.

Referring to FIG. 5 as well as FIG. 4, the holder 116 is a cylindrical block 124 with a flat upper surface 126 which is flanged at 127. The centre of the surface 126 is extended upwardly in an insert 133 around which is located, in use, the nozzle 140. The nozzle 140 is seated on the surface 126 and held in position by a clamping plate 145. The insert 133 is also provided with a fluid inlet 134 leading from the input 115 to a tube 135 projecting just above the top of the insert 133, and a fluid outlet 137 leading from the top of. the insert 137 to the coupling 122.

The flange 127 has a hole 125 which connects to the fuel hole 128 in the injector base 144. The fuel hole 128 in the injector base 144 connects to channel 132 along the length of the insert 133 to its top. The hole 125 in the flange has an input 131 which is connected to an air supply so that air flows up the channel to the top of the insert 133 and over the laser drilled hole 141 in the cavity to constitute a separator between the hole 141 and the fluid.

In this case the fluid is an oil/water emulsion with laser light scattering properties as well as cooling properties. The separator is a volume or jet of air that is delivered to the cavity 143 where the hole 141 breaks into it, via the hole 125 in the insert 133. The emulsion fluid is delivered via the fluid inlet 134 in the insert 133 through the tube 135 towards the point of the nozzle. The shape of the nozzle and the insert 133 are used to direct the fluid away from the hole 141 and to area 144 where the beam would strike the far wall of the cavity. In the area 144, the fluid scatters and defocuses the laser light. In this way a hole with sharp edges can be drilled without damaging the far wall of the cavity.

The tube 135 is out of alignment with the laser beam when the hole has been drilled, and is bent in order to direct the jet or stream of fluid away from the hole 141 so that there is no interaction between the fluid and the hole 141. The angle and position of the jet are set so that there is the maximum interaction between the jet and the laser beam so that the maximum protection of the back wall 144 is achieved. The fluid and air from the channel 132 are sucked out of the cavity via the opening 136 of the fluid outlet 137 in the insert. With the correct orientation of the jet and the correct positioning of the opening 136 and the correct pressure and flow rate of the fluid and the correct vacuum setting for the hole 137, it is possible to suck all the fluid out through the opening 136 without any fluid coming into contact with the laser drilled hole 141.

Alternatively, the fluid is directed so as to intercept the laser beam and then pass directly to the opening 136 of the fluid outlet 137 in the insert. In this case the fluid does not strike the far wall 144 of the cavity.

The insert 133 is substantially in metal-to-metal contact with the inner surface of the nozzle. The orientation of the insert 133 must be maintained with respect to the laser beam and yet the nozzle 140 must be rotated to drill several holes around the nozzle. Therefore a means is provided to release the seal between the insert and the inner surface of the nozzle 140 so that the insert 133 and the nozzle 140 can be rotated with respect to one another. In this example, when the laser drilling process has finished, the insert 133 is withdrawn a small distance so as to release the seal, the nozzle 140 is then rotated to the next circumferential orientation required, the insert 133 is pushed back to re-seal, and the next drilling operation begins.

The pump 113 can be operated continuously and the flow rates of pump 113 and pump 123 balanced to prevent excess or insufficient fluid in the nozzle cavity.

Figure 6:
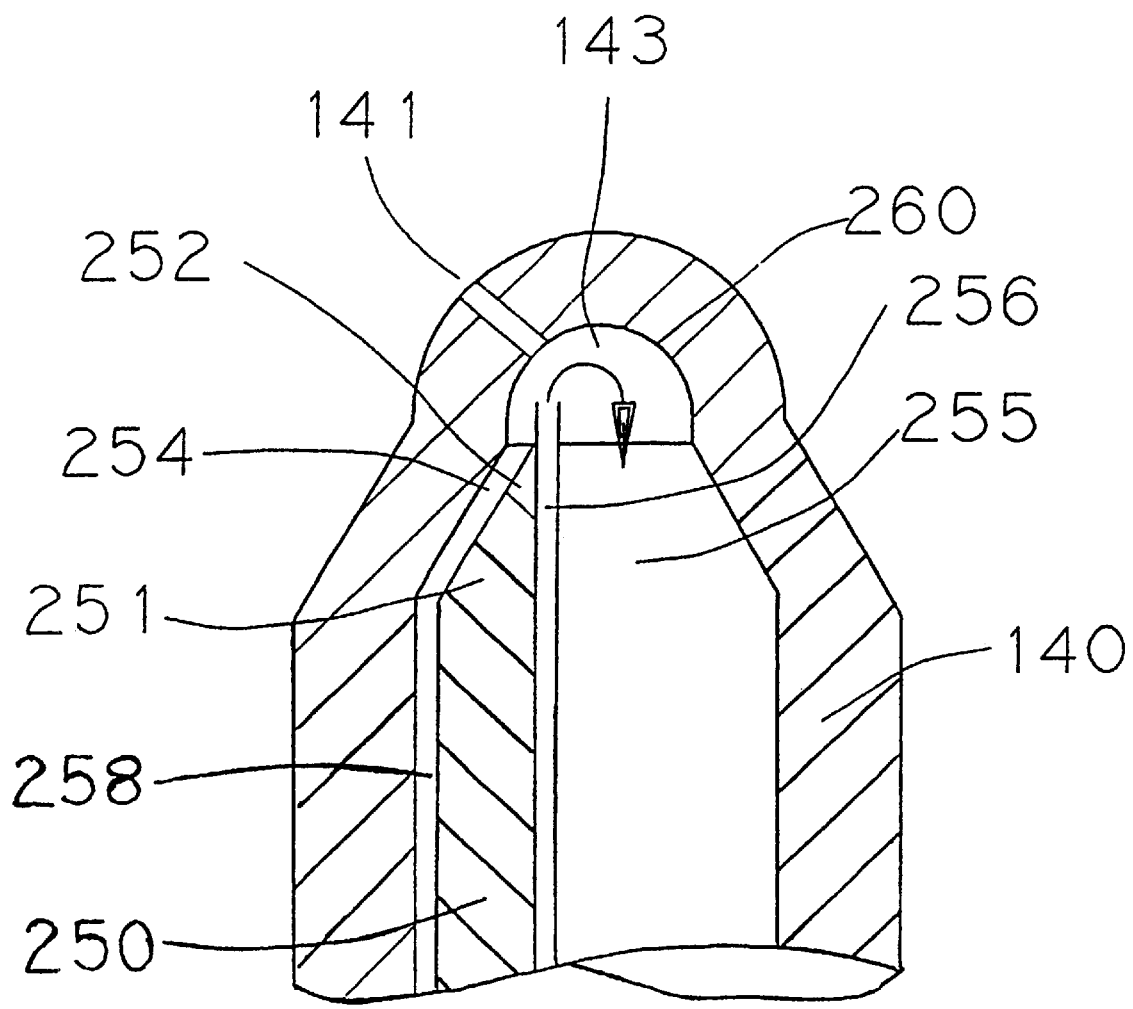
FIG. 6 shows part of an insert and a method of delivering fluid in a SAC nozzle.
Figure 7:
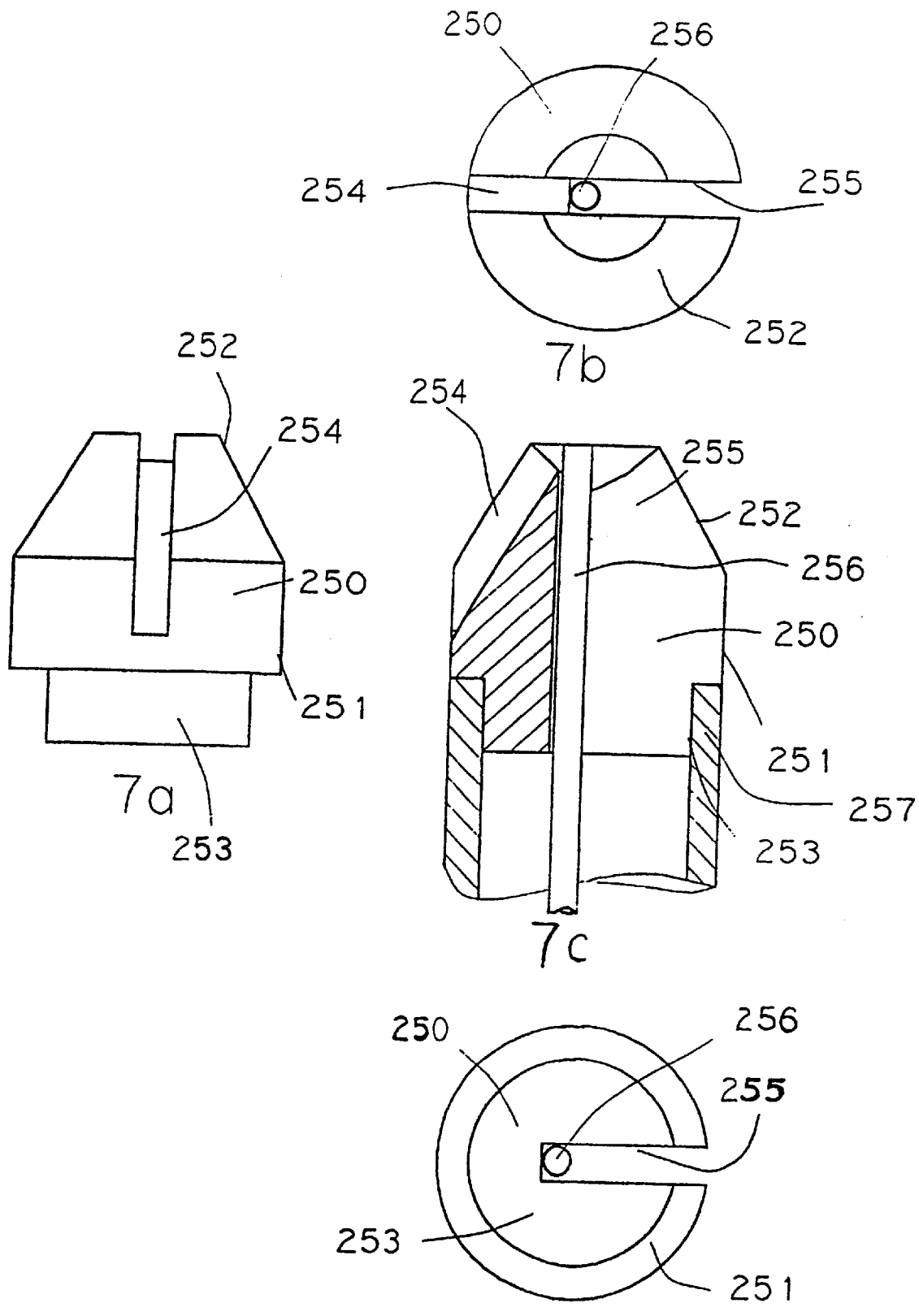
FIG. 7 shows details of the insert shown in FIG. 6 in a side view 7a, a plan view 7b, a cross-section 7c taken along the line 7—7 on side view 7a, and an underside view 7d.

Referring now to FIG. 6 and FIG. 7 as well as FIG. 4, an insert 250 for a SAC nozzle has a cylindrical body 251 and a frusto-conical top 252 which are an easy fit inside a SAC nozzle up to the spherical tip of the nozzle interior. Beneath the body 251, a reduced diameter neck 253 enables the insert to be mounted on top of a mounting tube 257, shown in cross-section 7c only, with the neck 253 socketted in the top of the mounting tube 257. The mounting tube 257 leads to the flat upper surface 126 of the cylindrical block 124 on which the SAC nozzle 140 is to be seated to be laser drilled at 141. To one side of the insert 250, a shallow slot 254 machined in the faces of the cylindrical body 251 and the top 252 provides a conduit for air to be supplied from an air supply at 258 around the mounting tube 257 to the cavity 143 above the top 252. To the opposite side of the insert 250 from the shallow slot 254, a deep slot 255 machined into the insert 250 beyond its longitudinal axis provides an exhaust from the cavity 143 and also houses a fluid supply tube 256 parallel to the longitudinal axis of the insert 250, but offset from it towards the shallow slot 254. The deep slot 255 leads into the interior of the tube 257 and thence to the output 122.

The shallow slot 254 delivers a stream of air over the entrance of the laser drilled hole 141 into the cavity 143. The stream of air is the separator. The barrier fluid is delivered via the tube 256 as a jet of fluid into the cavity 143. The tube 256 is off-centre, and therefore the jet is also off-centre and on the same side as the laser-drilled hole 141. The jet hits the cavity wall which is spherical at the tip of a SAC nozzle. The shape of the cavity guides the fluid around the cavity so that it returns over the area 260 where the beam would hit the back wall of the cavity thereby increasing the volume of barrier-fluid between the laser beam and the back wall 260. The fluid is sucked out of the cavity through the deep slot 255, the mounting tube 257 and the outlet 122 to the reservoir 112 which is under partial vacuum.

Figure 8:
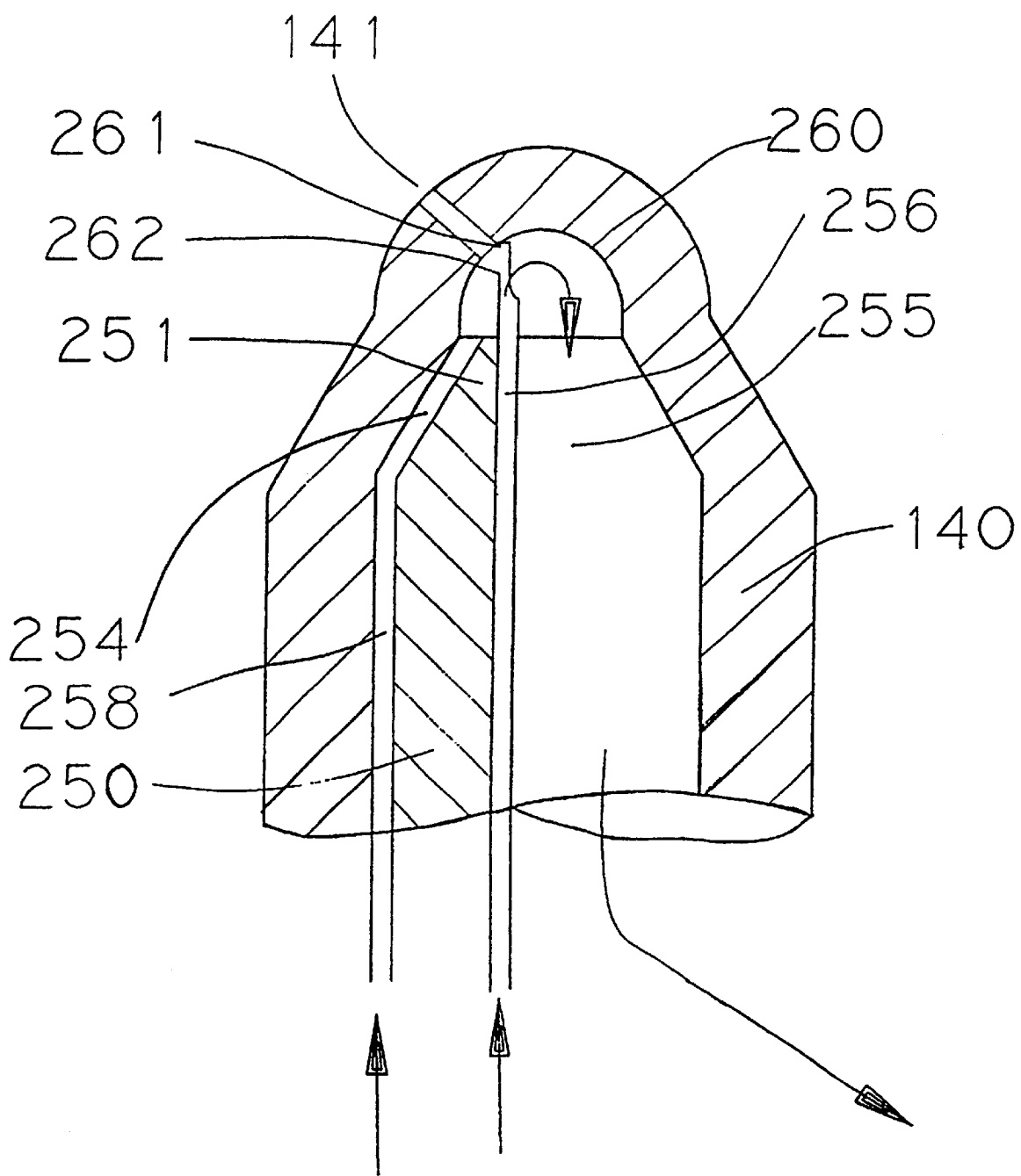
FIG. 8 is similar to FIG. 6 but shows a modification to the insert.

Referring now to FIG. 8, this shows a modification to the insert of FIG. 6 in which the tube 256 is extended to provide a separator in the form of a solid barrier. The side of the tube 256 adjacent to the hole to be drilled in the nozzle is extended upwards at 261 to nearly touch the top of the inside of the nozzle, and is provided with a hole or slot 262 aligned with the laser beam once it has penetrated into the cavity 143, so that the beam passes through the hole or slot 262 en route to the area 260 of the cavity wall. The extension 261 of the tube 256 helps to keep the fluid away from the hole 141, leaving a volume or stream of air between the hole 141 and the extension 261. That volume or stream of air and the extension 261 act as two separators to keep the fluid away from the hole 141. The laser light then would have to travel through the full flow of the barrier fluid travelling along the tube 256 and its extension 261 beside the hole or slot 262, and through the barrier fluid mixed with air as it washes over the area 260 to be scattered or absorbed before it can damage that area 260.

Referring again to FIG. 4, the apparatus is also provided with the copper laser 1150 of the first preferred example shown in FIG. 1, although other gas lasers may be used, or solid state lasers such as, but not limited to, a Nd:YAG laser, or Nd:YLF laser, or Nd:YVO4 laser or a frequency doubled, or frequency tripled or frequency quadrupled Nd:YAG or Nd:YLF or Nd:YVO4 or some other harmonic frequency of a solid state laser. The solid state laser may be lamp or laser diode driven. Alternatively, the laser is a semi-conductor diode laser or a harmonic frequency of a semi-conductor diode laser.

The laser is lined up to drill the hole 141, and may later go on to drill a ring-like set of such holes in the nozzle 140.

In use, the fluid barrier reservoir 110 is partly filled with a liquid having laser-light barrier properties, such as the proprietory machine lubricant available under the trade mark "DROMUS". This is a colloid which by multiple scattering when circulated is a barrier to laser-light. A nozzle 140 is mounted on the holder 116. The fluid pump 113 is run continuously and the flow switch 171 is used to deliver fluid to the nozzle or switch it into the bypass circuit 163. Continual flowing of the liquid through the pump 113 and reservoir 110 ensures consistent mixing of the colloid fluid. The fluid is sent through the filter 161 which removes any small solid particulates which may otherwise block the narrow passages and tubes in the insert. The fluid is emitted into the holder 116 via the coupling 121.

The fluid exits the holder via the coupling 122 into the vacuum reservoir 112 which is a chamber connected to the vacuum pump 123.

In normal operation, taps 165 and 166 are closed and pump 162 is not used. When the fluid level in reservoir 110 drops below a certain level, then taps 165 and 166 are opened and pump 162 is activated in order to replenish reservoir 110 with the fluid collected in reservoir 112. At this stage, extra water or oil may be added via couplings 167 and 168 in order to replenish the system with lost fluid and maintain the correct concentration.

What is claimed is:

1. A method of laser-drilling a hole through a workpiece into a cavity in the workpiece comprising drilling a hole through a workpiece with a laser, providing a fluid having laser barrier properties in the cavity by continuously supplying fluid to and extracting fluid from the cavity so that, when the hole is open to the cavity, laser light passing through the hole is incident upon the fluid whereby the workpiece across the cavity from the hole is protected from the laser light, and arranging that the fluid does not enter the laser drilled hole during the drilling process.

2. A method of laser drilling a hole through a workpiece into a cavity in the workpiece according to claim 1 comprising substantially the cavity in alignment with the hole to be drilled with a fluid having laser-barrier properties, drilling the hole with a laser beam and arranging that the fluid does not enter the hole when the hole is open to the cavity.

3. A method according to claim 2 wherein the fluid has laser-light scattering properties.

4. A method according to claim 3 wherein the fluid is a liquid.

5. A method according to claim 3 wherein the fluid is a smoke.

6. A method according to claim 4 wherein the liquid is a colloid.

7. A method according to claim 2 wherein the fluid has laser-light absorbing properties.

8. A method according to claim 7 wherein the fluid absorbs laser-light as thermal energy.

9. A method according to claim 8 wherein the fluid is a particulate suspension.

10. A method according to claim 9 wherein the fluid is a liquid suspension of pigment particles.

11. A method according to claim 9 wherein the fluid is gas-borne particles or liquid droplets.

12. A method according to claim 7 wherein the fluid fluoresces to re-emit the energy of incident laser light at a different frequency.

13. A method according to claim 12 wherein the fluid is a liquid solution of a dye-stuff.

14. A method according to claim 1 wherein the pressure of the fluid in the cavity is arranged to be sufficiently low that the fluid does not enter the hole when the hole is open to the cavity.

15. A method according to claim 14 wherein the fluid is a liquid and its surface tension and/or contact angle adjacent to the hole is taken into account in arranging the pressure of the liquid to be sufficiently low that the liquid does not enter the hole when the hole is open to the cavity.

16. A method according to claim 14 wherein the pressure of the fluid in the cavity is less than the ambient pressure external of the workpiece.

17. A method according to claim 16 including directing a gas stream at the workpiece at the same place as the laser beam and arranging that the pressure of the fluid in the cavity is less than the combination of the ambient pressure external of the workpiece and the pressure applied to the workpiece by the gas stream.

18. A method according to claim 1 wherein at least some of the fluid in the cavity is passed across alignment with the hole to be drilled.

19. A method according to claim 18 wherein the fluid is recirculated in the cavity.

20. A method according to claim 19 wherein the cavity is provided with a fluid flow pipe, and fluid is supplied to or extracted from the cavity through the fluid flow pipe to aid recirculation of the fluid in the cavity.

21. A method according to claim 20 wherein fluid is pumped into the cavity and fluid is pumped out of the cavity.

22. A method according to claim 20 wherein fluid is supplied to the cavity through the fluid flow pipe, and the fluid flow pipe is located in such a position that it is out of alignment with the hole to be drilled in the workpiece, but the stream of fluid issuing from the fluid flow pipe crosses such alignment before its flow loses its integrity.

23. A method according to claim 1 wherein the interior shape of the hole is drilled by orbitting the laser beam repeatedly around the desired path.

24. A method of laser-drilling a hole through a workpiece into a cavity in the workpiece according to claim 1 further comprising providing a separator between the fluid and the hole to control the interaction of the fluid and scattered laser light with the hole.

25. A method of laser-drilling a hole through a workpiece into a cavity in the workpiece according to claim 1 further comprising at least partially inserting a separator between the fluid and the hole so that when the hole is open to the cavity, the interaction of the fluid and the laser light with the hole is controlled.

26. A method according to claim 1 wherein which the fluid has cooling properties in addition to laser-light absorbing and/or laser-light scattering properties.

27. A method according to claim 24 wherein a volume of gas is used as the separator to control the interaction between the fluid and scattered laser-light with the hole.

28. A method according to claim 24 wherein a stream of gas is used as the separator to control the interaction between the fluid and scattered laser-light with the hole.

29. A method according to claim 24 wherein a solid barrier is used as the separator to control the interaction between the fluid and scattered laser-light with the hole.

30. A method according to claim 29 wherein the solid barrier is perforated with a hole or holes or a slot or slots.

31. A method according to claim 30 wherein a hole or slot is in alignment with the laser beam.

32. A method according to claim 29 wherein the solid barrier also prevents the fluid from splashing back or ingressing onto or into the laser drilled hole.

33. Apparatus for laser-drilling a hole through a workpiece into a cavity in the workpiece comprising fluid supply means for providing a fluid having laser-barrier properties in the cavity so that, when the hole is open to the cavity, laser light passing through the hole is incident upon the fluid whereby the workpiece across the cavity from the hole is protected from the laser light, the arrangement being such that the fluid does not enter the laser-drilled hole during the drilling process and means for continuously supplying fluid to and extracting fluid from the cavity.

34. Apparatus according to claim 33 for laser-drilling a hole through a workpiece into a cavity in the workpiece comprising a holder for the workpiece, fluid supply means for substantially filling the cavity in alignment with the hole to be drilled with a fluid having laser-barrier properties, and control means for arranging that the fluid does not enter the hole when the hole is open to the cavity.

35. Apparatus according to claim 34 wherein said control means comprises pressure or flow regulator means to arrange that the pressure of the fluid in the cavity is sufficiently low that the fluid does not enter the hole when the hole is open to the cavity.

36. Apparatus according to claim 34 wherein said fluid supply means comprises flow means to pass at least some of the fluid in the cavity through alignment with the hole to be drilled.

37. Apparatus according to claim 36 wherein the flow means is able to recirculate fluid in the cavity.

38. Apparatus according to claim 37 wherein the flow means comprises a fluid flow pipe to be inserted in the cavity for fluid to be supplied to or extracted from the cavity through the fluid flow pipe to aid recirculation of the fluid in the cavity.

39. Apparatus according to claim 38 including a first pump for pumping fluid into the cavity, a second pump for pumping fluid out of the cavity, and a fluid reservoir.

40. Apparatus according to claim 39 wherein the second pump is a vacuum pump to exhaust the reservoir to atmosphere.

41. Apparatus according to claim 39 wherein the second pump is a pressure pump for pumping fluid out of the cavity into the reservoir.

42. Apparatus according to claim 38 wherein the fluid flow pipe is located in such a position that it will be out of alignment with the hole to be drilled in the workpiece, but the stream of fluid that will issue from the fluid flow pipe in use will cross such alignment before its flow loses its integrity.

43. Apparatus according to claim 33 also including a supply of a fluid having laser-barrier properties and a laser.

44. Apparatus according to claim 43 wherein the laser is a copper laser.

45. Apparatus according to claim 43 wherein the laser is a solid-state laser.

46. Apparatus according to claim 43 wherein the laser is a Nd:YAG laser, or a Nd:YLF laser or a Nd:TYO4 laser, or a frequency doubled Nd:YAG or Nd:YLF or Nd:YVO4 laser or another frequency harmonic or frequency shift of said solid state laser.

47. Apparatus for laser-drilling a hole through a workpiece into a cavity in the workpiece according to claim 33 further comprising a separator between the fluid and the hole to control the interaction of the fluid and scattered laser-light with the hole.

48. Apparatus according to claim 47 wherein the separator is a solid barrier.

49. An apparatus according to claim 48 wherein the solid barrier is perforated with a hole or holes or a slot or slots.

50. An apparatus according to claim 49 wherein a hole or a slot is in alignment with the laser beam.

51. An apparatus according to claim 48 wherein the solid barrier also prevents the fluid from splashing back or ingressing onto or into the laser drilled hole.

52. An apparatus according to claim 47 wherein a volume of gas is used to control the interaction between the hole and the fluid.

53. An apparatus according to claim 47 wherein a stream of gas is used as the separator to control the interaction between the hole and the fluid.

54. An apparatus according to claim 33 further comprising manual or automatic means of loading the workpiece onto the apparatus and unloading the workpiece when the drilling is complete.

55. An apparatus according to claim 33 further comprising manual or automatic means to position the workpiece with respect to the laser beam so as to drill a hole or holes in the correct position(s).

56. Apparatus for carrying out a method of laser-drilling a hole through a workpiece into a cavity in the workpiece comprising drilling a hole through a workpiece with a laser, providing a fluid having laser-barrier properties in the cavity so that, when the hole is open to the cavity, laser light passing through the hole is incident upon the fluid whereby the workpiece across the cavity from the hole is protected from the laserlight, and arranging that the fluid does not enter the laser-drilled hole during the drilling process.

* * * * *